United States Patent [19]

Breuking et al.

[11] 3,862,343

[45] Jan. 21, 1975

[54] EDIBLE COMPOSITIONS HAVING A POULTRY MEAT FLAVOR AND PROCESSES FOR MAKING SAME

[75] Inventors: Karel Willem Breuking, Hilversum; Andries Van Delft, Nieuw Loosdrecht, both of Netherlands; Christopher Giacino, Califon, N.J.

[73] Assignee: International Flavors and Fragrances Inc., New York, N.Y.

[22] Filed: Nov. 8, 1972

[21] Appl. No.: 304,806

[52] U.S. Cl.................. 426/211, 426/212, 426/364
[51] Int. Cl............................................. A23l 1/26
[58] Field of Search............ 426/211, 212, 65, 175, 426/221, 222, 364, 224

[56] References Cited
UNITED STATES PATENTS
3,394,015   7/1968   Giacino........................... 426/212 X

*Primary Examiner*—Raymond N. Jones
*Assistant Examiner*—Esther L. Massung
*Attorney, Agent, or Firm*—Brooks, Haidt & Haffner

[57] ABSTRACT

Processes for imparting a poultry meat flavor to foodstuffs by adding thereto a small amount of the reaction product of (I) the whole internal contents of a poultry egg or egg white or egg yolk, with (II) a sulfur compound such as cysteine or taurine and, if desired, (preferably) (III) thiamine and/or thiazole alkanols and (IV) other free amino acids and/or polypeptides and, in addition, if desired, a monosaccharide and/or a disaccharide, such as sucrose and/or a polysaccharide.

4 Claims, No Drawings

EDIBLE COMPOSITIONS HAVING A POULTRY MEAT FLAVOR AND PROCESSES FOR MAKING SAME

BACKGROUND OF THE INVENTION

This invention relates to flavoring foodstuffs, to compositions of flavoring foodstuffs, and to the products so obtained.

Much attention has been devoted to improving the flavor of foodstuffs and particularly the flavors of meat products, fruits and confectioneries. There is also a need to provide compositions and processes for improving the flavors of poultry meat products such as patties containing chicken meat or duck meat or turkey meat, or for providing savory poultry flavors to foods containing no poultry meat or to poultry meat products having only a low level of flavor.

A substantial number of investigations have been carried out relating to reacting such materials as amino acids, hydrolyzed vegetable proteins, sugars, sulfur-containing compounds (e.g. cysteine and hydrogen sulfide) and ribonucleotides in an effort to produce meat tasting products including poultry meat tasting products, or ingredients therefor. Thus, for example, the following publications set forth such reaction products and methods for preparing same:

| | Publication | Reactants |
|---|---|---|
| (1) | U.S. Patent 3,394,017 | Poultry meat flavor produced by reacting thiamine and a mixture of amino acids |
| (2) | U.S. Patent 3,519,437 | Poultry flavor produced by reacting thiamine and 2-aminoethane sulfonic acid. |
| (3) | South African published Patent Application 70/4725 | A saccharide, an amino acid and an egg component which can be either egg white, egg yolk, or the contents of whole egg. |
| (4) | U.S. Patent 3,532,514 | Cysteine, sugar, fatty acid material. |
| (5) | Belgian Patent 740,221 | Reducing sugar and fish product extract |
| (6) | U.S. Patent 3,394,015 | Sulfur-containing compound and hydrolyzed vegetable protein (sugar-free) |
| (7) | U.S. Patent 3,394,016 | Thiamine and an aliphatic carboxylic acid |
| (8) | German Offen. 1,932,800 | Hydrogen sulfide and a 4-hydroxy-2,3-dihydrofuran-3-one |
| (9) | U.S. Patent 2,918,376 | Fish protein hydrolyzate and cysteine |
| (10) | U.S. Patent 2,887,387 | Fish protein hydrolyzate and saccharide |

Still other publications set forth the use of eggs themselves as food ingredients. Two of these publications are as follows:

Canadian Pat. No. 898,055
Canadian Pat. No. 898,056

However, none of the foregoing references, disclosing processed food flavoring materials, discloses the production of a natural poultry meat-flavored material from reactants free of meat and wherein one of the reactants is an egg yolk, egg white or the internal contents of an entire poultry egg, and another of the key reactants is a sulfur-containing compound. Although the above-mentioned South African Pat. Application 70/4725 describes reaction products wherein one reactant is the contents of an egg and another reactant is a mixture of amino acids, e.g. hydrolyzed vegetable protein, the reaction product disclosed is a meat extract flavor rather than a poultry meat flavor and, no sulfur-containing compound is set forth as one of the reactants, in addition, thiamine or a salt thereof or a precursor thereof is not included as one of the reactants.

THE INVENTION

This invention relates to novel poultry flavoring compositions and to processes for preparing them.

Food products enhanced with poultry-like flavors are well-known and have long been used. There is considerable demand for poultry flavor products in which the actual poultry meat, such as chicken, turkey, duck and the like is not needed or is actually undesirable. For example, in the preparation of sauces and purees, the poultry flavor is desired, but it is necessary to cook with the desired poultry and then to remove the meat by straining or some similar operation to obtain the final product ready for use.

Additionally, where weight, space and/or storage capability are problems, e.g. when a convenience food is prepared, the presence of the actual poultry meat may be undesirable because it will deteriorate in storage and spoil the food. Moreover, there are occasions when sterilizing or otherwise preserving the natural product is extremely deleterious to the flavor of the natural materials and the desired natural flavor is lost.

U.S. Pat. Nos. 3,394,017 and 3,519,437 in part, provided solutions to the aforementioned problems by providing methods for the production of poultry flavors which contained a substantial number of the notes of natural poultry flavors but which did not contain actual meat products. However, these two patents do not teach techniques for producing highly intensified controlled meatless poultry flavors. By the word "controlled" is meant poultry flavors having either a "duck" meat flavor character or an intense "turkey" meat character or an intense "chicken" meat character or an intense "quail" meat character or an intense "squab" meat character. Although the two aforementioned publications gave rise to general poultry flavor applications, the high degree of control of intensity in conjunction with the nature of the specific particular poultry flavor was not taught therein.

This invention provides methods for the production of controlled intense poultry flavors which are substantially indistinguishable from the natural particular poultry flavor desired.

This invention also provides essentially natural particularly controlled poultry-flavored products which are suitable for incorporation into a wide range of foodstuffs.

Further and more specific objects, features and advantages will clearly appear from the detailed description below taken in conjunction with the accompanying examples which illustrate certain preferred embodiments of this invention.

In one aspect of this invention, an edible flavor composition is produced by heating a reaction mixture of a poultry egg yolk or a poultry egg white or the internal contents of an entire poultry egg with a sulfur-containing compound to produce a reaction product. This heating is carried out for a period of time sufficient to develop a flavor of poultry or fowl in the mixture. Depending on the particular nature of the egg used the resulting poultry meat flavor will be the flavor of the meat of the species which produced the egg. Thus, for example, where the egg yolk of duck egg is used, the resulting flavor will be that of duck meat. The same holds true where the egg white of duck eggs are used. The edible reaction products produced by this process are novel poultry flavoring materials, or bases, and can also produce other sweet meaty flavor notes. Edible compositions having enhanced flavor and which comprise a food and the aforesaid reaction product are further contemplated by this invention. In addition, other reactants may be used to modify or augment the poultry flavor without changing in kind the resulting specific poultry flavor produced. Thus, for example, acid salts of thiamine in the reaction mixture will give rise to a more natural intense poultry flavor but will not bring about a change in the specific nature of the poultry flavor produced. Other materials that can be added in addition to or in lieu of thiamine are thiazole alkanols (which are, for example, thiamine precursors) such as those described in U.S. Pat. No. 3,681,088, issued on Aug. 1, 1972 and other free amino acids and polypeptides.

As described above, the invention, in its broad aspect involves heating a mixture comprising a poultry egg yolk or a poultry egg white or the internal contents of an entire poultry egg and a sulfur-containing compound at an elevated temperature for a period of time whereby a poultry meat flavor is developed. It is to be noted that the pre-mix composition, per se, possesses no poultry meat characteristics and hence our invention may be regarded as being in the discovery that at least one of the components of the contents of the particular poultry egg has the ability to impart specific poultry meat flavor nuances to a reaction flavor when employed as a reactive component with a sulfur compound and, optionally but preferably, thiamine or a thiamine salt or a precursor therefor as defined infra.

The term "poultry egg" is herein intended to mean a non-fertilized chicken egg, duck egg, turkey egg, squab egg, goose egg, quail egg and pheasant egg and the like, in their natural states or in their dried forms (e.g. freeze-dried eggs) or defatted egg yolks or in the form of solutions of said dried forms of poultry eggs.

The term "sulfur-containing compounds" is intended to mean sulfur-containing amino acids which have the ability to liberate hydrogen sulfide when reacted, or lower alkyl mercaptans, or lower alkyl sulfides, or lower alkyl disulfides, or amino alkane sulfonic acids or salts thereof, e.g. the sodium salt of amino ethane sulfonic acid (taurine). The term "sulfur-containing compounds" may also include an inorganic sulfur compound or hydrogen sulfide itself, each of which is adapted to liberate a flavor under heating. Such inorganic sulfur compounds are designated herein as having the formula $MH_x$, wherein M is selected from the group consisting of an alkali metal (e.g. sodium or potassium), an alkaline earth metal (e.g. calcium or magnesium) and ammonium and $S_x$ is selected from the group consisting of sulfide, polysulfide and sulfhydrate.

When hydrogen sulfide or a lower alkyl mercaptan is used, it is necessary to control the amount used so as to avoid overpowering the aroma of the product with the aroma of the mercaptan or the hydrogen sulfide. The lower alkyl mercaptans and sulfides preferably contain from one up to six carbon atoms. The lower alkyl disulfides preferably contain one to three carbon atoms. Cysteine and methionine and their acid salts, such as cysteine hydrochloride, are especially preferred sulfur-containing amino acids. Especially preferred products resembling natural poultry flavor are produced by means of heating a mixture of an egg yolk (or powdered egg yolk) with cysteine hydrochloride at reflux at atmospheric pressure for a period of 4 hours.

Cysteine and cystine are sulfur-containing amino acids readily available as free amino acids or as salts, both acid and basic. Preferably, the acid salts, especially the halogen acid salts, such as the hydrochloride are utilized. The inorganic sulfur-containing compounds mentioned above include sodium sulfhydrate and sodium sulfide. Instead of sodium compounds, corresponding compounds of potassium, calcium and ammonium or substituted ammonium may be used. Any such compound employed must be capable of reacting to give the desired specific natural poultry meat note.

Other organic sulfur-containing compounds useful in the practice of our invention include methyl mercaptan, ethyl mercaptan and propyl mercaptan, dimethyl sulfide, dimethyl disulfide and methyl ethyl sulfide. The term "sulfur-containing compounds" as used herein is not intended to include thiamine or thiamine precursors or acidic or basic salts of thiamine. Such thiamine salts or precursors of thiamine or thiamine per se are used preferably in addition to the "sulfur-containing compounds" of our invention in the reaction mass.

Additional flavor nuances may be introduced into the reaction product of our invention by incorporating into the reaction mass prior to or during the heat reaction thiazole derivatives, such as, for example, thiamine hydrochloride and/or 4-methyl-5-($\beta$-hydroxyethyl)-thiazole. Instead of using thiamine hydrochloride, the thiamine may be used as a free base; but it is preferably employed as an acid salt and, indeed the hydrochloride is especially suitable. In addition, free amino acids, such as alanine, leucine, valine, glutamic acid and/or various polypeptides including dipeptides and tripeptides may also be added to the reaction mass prior to or during the heat reaction process. In addition, quantities of nucleotides may be added prior to, during or subsequent to the reaction between the sulfur-containing compound and the egg contents or egg yolk or egg white. The preferred nucleotides used in the practice of this invention are mixtures of disodium inosinate and disodium guanylate. In addition, prior to or during the reaction between the sulfur-containing compound and the egg contents (or component thereof), a quantity of a saccharide material such as d-xylose, ribose, sucrose, and dextrose may be added in order to modify the resulting poultry meat type flavor.

Lower alkyl carbonylic materials, such as ketones and alkyl aldehydes can be admixed into the reaction system during or subsequent to the heating step. It is generally preferred to add these materials after heating the reaction mass since they are generally volatile, and losses thereof may occur during the heating. The ketonic materials used in this aspect of the invention are preferably lower alkanones, and hydroxy-substituted alkanones containing from about four to eight carbon atoms such as diacetyl, acetylmethylcarbinol and acetylpropionyl. The alkyl aldehydes are preferably the aldehydes containing from about five up to 12 carbon atoms. Especially preferred are n-pentanal, n-hexanal, n-heptanal, 2,4-nonadienal, 2,4-decadienal, and 2,4-undecadienal. Conveniently, these aldehydes and/or ketones are employed at levels ranging from 0.01 up to 0.1 times the weight of the egg component used. The reaction between the sulfur-containing compound and the egg compound is preferably carried out at reflux conditions (usually over 100° C) at pressures of between 1 and 10 atmospheres for periods of times of from 0.2 up to 10 hours. It is to be emphasized that, generally, temperatures above 400° C make the reaction difficult to control and may well produce uncharacteristic burnt notes even with very short reaction times (e.g. of the order of 10 – 20 minutes). Accordingly, it is preferred to carry out the reaction at temperatures of from 100° C up to 350° C; until the desired flavor development is achieved. As stated above, the heating periods may range from about 0.2 hours up to about 10 hours depending upon the heating method used.

The process can be carried out on a batch basis in small quantities of, for example, 50 to 100 grams or it can be carried out batchwise, semi-continuously, or continuously on much larger quantities of 500 kilograms or more.

The weight percent of sulfur-containing compound based on dry egg contents or component thereof is from 1 percent up to 20 percent; preferably between 2 and 5 percent. Where it is desired to use thiazole derivatives for the purpose of introducing additional flavor nuances into the product of our invention, the weight ratio of thiazole derivatives (e.g. thiamine hydrochloride) to sulfurcontaining compounds is between 0.25:1 and 1:1, preferably 0.5:1. Where it is desired to use a saccharide material in the reaction mass in order to introduce still additional flavor nuances into the product of our invention, the weight ratio of saccharide to sulfur-containing compound is between 1:100 and 1:3; preferably 1:6.

It should be noted that the presence of the saccharides in the reaction mass gives rise to a reaction product having somewhat more intense poultry meat flavor characteristics. Care should be exercised in utilizing such saccharides, however, since they may tend to contribute some burnt notes to the ultimate reaction product. When used, suitable results are obtained at levels ranging up to about 25 percent by weight based on the total weight of the reaction mass. Preferably the range is from 0.5 to 5 weight percent of the overall reaction mass. This range is further limited by the preferred ratio of saccharide to sulfur-containing compound.

Preferably, but not necessarily, a large weight excess of water or other reaction medium (e.g. beef fat, vegetable fat, chicken fat, duck fat, and fatty acid glycerides, such as "Neobee M-5" produced by the Drew Chemical Division of U.S. Filter Corporation or fish oil or mixtures of such fats and oils with water either in emulsified or non-emulsified forms) is used in preparing the reaction product of our invention, although such excess is not essential. Varying amounts of water or fat or fish oil, for example from about 1:1 up to about 10:1 by weight based on the total weight of the remainder of the dry egg contents or component thereof can be used. In the case of aqueous mixtures after the subsequent reaction with the sulfur-containing compound the water can be at least partially evaporated to produce a solid or a semi-solid edible composition. When using triglyceride fats, the fatty acids predominantly range in carbon chain length from about 20 carbon atoms up to about 22 carbon atoms. The term triglyceride fat will be understood to mean both fats and oils. It is preferred that the triglyceride fats be refined, bleached and deodorized. They can be in their natural form or they can be hydrogenated.

The quantity of reaction product utilized in the practice of our invention when added to a foodstuff can be varied to provide a wide range of poultry meat type flavors. At levels as low as 0.1 percent, the reaction product begins to impart a very light, almost undefinable sensation in aqueous solution. As the level is increased to 0.2 percent, a different pleasant poultry meat-like character is imparted to an aqueous solution. As the level reaches 0.5 percent a definite, good characteristic poultry meat-like flavor and aroma is obtained and this level persists up to levels of 2 percent and beyond, where the substance leaves a light, lingering aftertaste. At levels higher than 1 percent the poultry meat-like flavor indistinguishable from the natural poultry meat flavors. All parts, proportions, percentages and ratios herein are by weight unless otherwise indicated.

The reaction product of our invention can be added in pure form to foodstuffs or in admixture with other flavors and/or aroma imparting ingredients and/or in admixture with other non-toxic edible solvents (e.g. water, ethanol, wines and liqueurs), thickeners (e.g. starch paste) carriers and extenders (e.g. bread crumbs). The resulting mixtures may be used as such or may be further processed as by heating.

It will be understood by those skilled in the art that regardless of the purity of the reactants used they should contain no noxious or noisome components which would interfere with the flavor conferred on foodstuffs or on its safety for use in edible materials.

It is contemplated herein that foodstuffs flavored according to this invention include both solid and liquid preparations for oral consumption by human beings and by animals particularly warm-blooded domestic animals, such as are used for pets or raised for consumption.

The products of this invention may be provided as dry solids, in liquid mixtures or in pastes. Preferably, they are prepared by heating the poultry egg contents or component thereof with the sulfur-containing compound in admixture with water. The resulting end product may be used as such, or it may be concentrated for use. If solid products are desired, the same may be obtained by drying the liquid mixtures. The aqueous compositions are dehydrated by spray-drying although drum-drying, freeze-drying and other drying procedures are also applicable to the reaction product of our invention. A solid carrier is often added to the liquid mixture before drying.

When carrying out the spray-drying process which is the preferred drying process, we have found that carriers are useful in extending the flavor of our products when so prepared. These carriers do not diminish the quality of the flavor, but they stabilize it and increase the shelf life of the product. Polysaccharides having relatively complex structures such as gum arabic gum tragacanth, gum karaya and guar gum and mixtures of same are useful, as are cellulose derivatives such as methyl cellulose and carboxy methyl cellulose or partially hydrolyzed starch such as dextrin, and the like.

In a preferred process, an aliquot of the liquid composition is dried and the flavor solids content of the composition determined. An amount of carrier substantially equal to the calculated solid content of the liquid composition is added thereto and the mixture dried, preferably by spray-drying. Alternatively, an amount of carrier substantially equal to the weight of original egg material (on a dry or dehydrated weight basis) and sulfur-containing compound is added to the liquid composition after reaction of the ingredients and then dried. The preferred amounts of carrier are from 0.2:1 up to about 2:1 based on the solids content of the liquid mixture.

The following examples illustrate the manner in which we now prefer to practice our invention. It is to be understood that this invention is not to be considered as limited thereto except as indicated in the appended claims. In the examples, the various ingredients are listed in parts by weight.

EXAMPLE I

300 Grams of chicken egg yolk powder is intimately admixed with 8.8 grams of cysteine hydrochloride, 4.4 grams of thiamine hydrochloride and 1,030 grams of water. The resulting slurry is then heated to reflux at 1 atmosphere absolute pressure and maintained at reflux with stirring for a period of 4 hours. The resulting slurry is divided into two equal portions; portion A and portion B. Portion A is filtered. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry product with an intense chicken flavor having a very close resemblance to natural chicken flavor (Product A). Product B (portion B produced supra) also has an intense chicken flavor having a very close resemblance to natural chicken flavor.

EXAMPLE II

A chicken noodle soup is prepared by mixing together

| Ingredient | Gms./Unit |
| --- | --- |
| Salt | 5.00 |
| Product A produced in Example I | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

3 cups of water are added to the above mixture; and the mix is brought to a full boil, simmered for 5 minutes, and is then ready to serve.

EXAMPLE III

A chicken noodle soup is prepared by mixing together

| Ingredient | Grams |
| --- | --- |
| Salt | 5.00 |
| Product B produced in Example I | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetble pieces | 36.00 |

3 cups of water are added to the above mixture; and the mix is brought to a full boil, simmered for 5 minutes, and is then ready to serve.

EXAMPLE IV

In a pressurized scraped wall "Giusti" reaction vessel the following materials are introduced:

| | |
| --- | --- |
| Chicken egg yolk powder | 12 kg |
| Water | 41.2 kg |

0.704 kg. of cysteine hydrochloride and 0.352 kg. of thiamine hydrochloride is added and the reaction vessel is operated for a period of 30 minutes at a temperature of 130° C and at a pressure in the range of from 2 up to 3 atmospheres. The reaction mass is then cooled yielding a product having an excellent chicken flavor.

EXAMPLES V–IX

The following mixtures are each refluxed for a period of 5 hours at atmospheric pressure. In each case an intense chicken flavor having a close resemblance to the flavor of natural chicken meat is produced.

| Ingredients | V | VI | VII | VIII | IX |
| --- | --- | --- | --- | --- | --- |
| | | | Parts by Weight | | |
| L-cysteine hydrochloride | 20 | 20 | 20 | 6.80 | 136 |
| Thiamine hydrochloride | 20 | 20 | 20 | 9.35 | 187 |
| Chicken egg yolk solids | 100 | 100 | 100 | 1.15 | 115 |
| Water | 700 | 700 | 700 | — | — |
| Dextrose | 10 | — | 10 | .13 | 1.30 |
| Arabinose | — | 10 | — | — | — |
| Chicken fat | 150 | 150 | 150 | .40 | 60 |

What is claimed is:

1. A process for preparing an edible meatless poultry meat flavored composition comprising the steps of (A) intimately admixing in the absence of any natural meat or poultry meat products (i) powdered chicken egg yolk; (ii) L-cysteine hydrochloride and (iii) thiamine hydrochloride said powered chicken egg yolk, L-cysteine hydrochloride and thiamine hydrochloride being present in amounts sufficient to produce a poultry flavor, and (B) heating the resulting mixture at a temperature and for a period of time whereby a poultry meat flavored product is produced.

2. A poultry flavored meatless food comprising the product produced by the process of claim 1 intimately admixed with a foodstuff in an amount sufficient to impart the desired intensity of flavor.

3. The process for the production of the edible composition of claim 1 which includes the further step of adding guum arabic to the poultry flavor and spray drying the resulting mixture.

4. A poultry flavored meatless food comprising a product produced by the process of claim 3 intimately admixed with the foodstuff in an amount sufficient to impart the desired intensity of flavor.

* * * * *